235-381 SR
11/3/87 XR 4,704,518

United States Patent [19]

Brunn et al.

[11] Patent Number: 4,704,518

[45] Date of Patent: Nov. 3, 1987

[54] TICKET PRINTING AND ISSUING APPARATUS AND METHOD WITH IMPOUND MEANS

[75] Inventors: Frederick A. Brunn, San Diego; Edward A. Hoppe, Oceanside; Paul M. Volpini, San Diego, all of Calif.

[73] Assignee: International Totalizator Systems, Inc., San Diego, Calif.

[21] Appl. No.: 935,293

[22] Filed: Nov. 26, 1986

[51] Int. Cl.[4] .............................................. G06K 13/08

[52] U.S. Cl. .................................... 235/480; 235/381; 271/3; 271/275; 364/412; 400/625; 400/642

[58] Field of Search ............... 101/66; 400/608.3, 642, 400/634, 629, 624, 625; 235/480, 380, 379, 381; 377/4; 271/115, 267, 275, 3; 364/412

[56] References Cited

U.S. PATENT DOCUMENTS

| | | | |
|---|---|---|---|
| 3,941,375 | 3/1976 | LaWhite et al. | 271/275 X |
| 4,007,356 | 2/1977 | Stucke et al. | 235/480 |
| 4,164,649 | 8/1979 | Anderegg et al. | 235/480 |
| 4,534,666 | 8/1985 | Watanabe | 400/207 |
| 4,659,073 | 4/1987 | Leonard | 271/275 X |

*Primary Examiner*—Clifford D. Crowder

*Attorney, Agent, or Firm*—Brown, Martin, Haller & Meador

[57] ABSTRACT

An apparatus for printing and issuing tickets has a circular ticket guide in which a drive cylinder is disposed to selectively rotate in a forward or reverse direction. A ticket magazine feeds a blank ticket into the ticket guide in the forward direction and the cylinder rotates, driving the ticket in the forward or reverse direction in order to execute a series of process steps involved in issuing the written ticket. Arrayed in an arcuate sequence adjacent the ticket guide in the forward direction are a printing and reading apparatus, a ramped impound aperture, and a ramped issue aperture. A ticket is fed from the hopper in the forward direction and the drive cylinder is rotated to carry the ticket past the printing and reading apparatus where information is written and verified on the ticket. The drive cylinder continues to rotate in the forward direction, carrying the ticket past the impound, and then the issue aperture. The drive cylinder then reverses, first offering the ticket through the issue aperture and then, if the ticket is not manually removed from the aperture, the drive cylinder is rotated to feed the ticket into an impound enclosure through the impound aperture.

6 Claims, 8 Drawing Figures

TICKET PRINTING AND ISSUING APPARATUS AND METHOD WITH IMPOUND MEANS

CROSS-REFERENCE TO RELATED PATENT APPLICATIONS

This application contains material that is related to U.S. patent application Ser. No. 909,507, filed on Sept. 19, 1986, for "TICKET PROCESSING TERMINAL WITH A SINGLE-CYLINDER TICKET ADVANCING MECHANISM."

BACKGROUND OF THE INVENTION

The present invention is in the field of ticket printing and issuing, and pertains particularly to an apparatus for writing and issuing tickets.

Prior art ticket processing mechanisms have been used in ticket terminals for moving a ticket through various stages of issue processing. For example, the DM-4 Datamark ticket issuing terminal, manufactured and sold by the assignee of this patent application, includes a ticket advancing mechanism having a pair of spaced-apart, parallel ticket rollers which move a ticket in a figure-8 pattern for processing on both sides of the ticket. By processing is meant the printing of information onto and validation of information on one or more faces of a ticket. The ticket advancing mechanism of the Datamark terminal can be understood by reference to U.S. Pat. No. 4,677,553, which is assigned to the assignee of the subject patent application and incorporated herein by reference.

Another ticket advancing mechanism for moving a ticket through various stages of processing in a single circular ticket guide is taught in the cross-referenced patent application, which is assigned to the assignee of this application and also incorporated herein by reference.

Other mechanisms for processing documents such as tickets by writing and issuing the documents are exemplified in apparatus which propel a ticket along an essentially linear pathway which is branched near its terminus to provide separate channels for issuing or impounding a ticket. Such branching is represented by U.S. Pat. No. 4,164,649. In general, ticket processing equipment of this sort requires the provision of a linear ticket path, branches in the path, and a sequence of reciprocating mechanisms distributed along the path to propel a ticket through the path and into any of its branches. One will appreciate that such an architecture results in an elongated ticket processing apparatus which occupies an amount of space proportional to the length of the path. Further, the plethora of driving mechanisms requires a complex electromechanical control mechanization to orchestrate the operations of the driving mechanisms.

An effort to minimize ticket processing path length in a ticket processing terminal is well represented by the DM-4 Datamark terminal of the assignee. The DM-4 terminal is especially significant in that the figure-8 ticket pathway permits processing on both sides of a ticket in a relatively compact configuration. However, in applications where extreme compactness is required, it is possible that the two drive rollers which form the ticket processing pathway might limit the use of the DM-4 terminal.

Therefore, there is an evident need for a ticket writing and issuing apparatus with a configuration which will further reduce the size of the apparatus by minimizing the space required for movement of a ticket undergoing processing, yet which permits the apparatus to effectively write and issue a ticket.

It is therefore an object of the present invention to provide a compact, yet multifunctional, ticket writing and issuing apparatus.

SUMMARY OF THE INVENTION

The invention is expressed in structural form as an apparatus for printing and issuing tickets or the like. The apparatus includes a housing with a circular ticket guide. A drive cylinder is enclosed by and disposed in the ticket guide for driving a ticket in the ticket guide in a forward direction or in a reverse direction, the reverse direction being opposite to the forward direction. A ticket feed magazine adjacent the ticket guide feeds a blank ticket through a feeding aperture into the ticket guide in the forward direction. A printing and reading mechanism adjacent the ticket guide prints and reads information on a ticket being driven in the ticket guide. A ramped impound aperture is provided adjacent the ticket guide for diverting a ticket being driven in the reverse direction from the ticket guide, with the diverting being in an impound direction which is tangential to the ticket guide. A ramped issue aperture, arcuately displaced in the forward direction from the impound aperture, is also located adjacent the ticket guide for diverting a ticket being driven in the reverse direction from the ticket guide. The ramped issue aperture diverts a ticket in an issue direction which is tangential to the ticket guide and which is disposed with respect to the impound direction at an angle not equal to 0°. Control means are connected to the rotatable drive cylinder for selectively controlling the drive cylinder to rotate in the forward direction or the reverse direction.

This structure supports a method for printing and issuing tickets which includes the steps of feeding a ticket into the ticket guide from the ticket hopper and driving the ticket in the forward direction in the ticket guide past the printing and reading mechanism. As the ticket passes the mechanism, transaction information is written onto the ticket. The ticket, with information now printed on it, is driven in the forward direction past the ramped issue aperture and then is driven in the reverse direction while being diverted at the issue diverting point from the ticket guide to a stationary issue position in which a portion of the ticket extends out of the ticket guide. In the method, if the ticket is not manually removed from the ticket guide after being diverted to the stationary issue position, the ticket is driven from the issue position wholly back into the ticket guide in the forward direction, the ticket is advanced in the forward direction to an impound diverting point and then driven in the reverse while being diverted by the ramped impound aperture totally out of the ticket guide to an impound container.

It will be evident that the above-stated objectives are achieved, together with other attendant advantages, when the following detailed description is read in conjunction with the below-described drawings.

DETAILED DESCRIPTION OF THE PREFERRED EMBODIMENT

Figure 1:
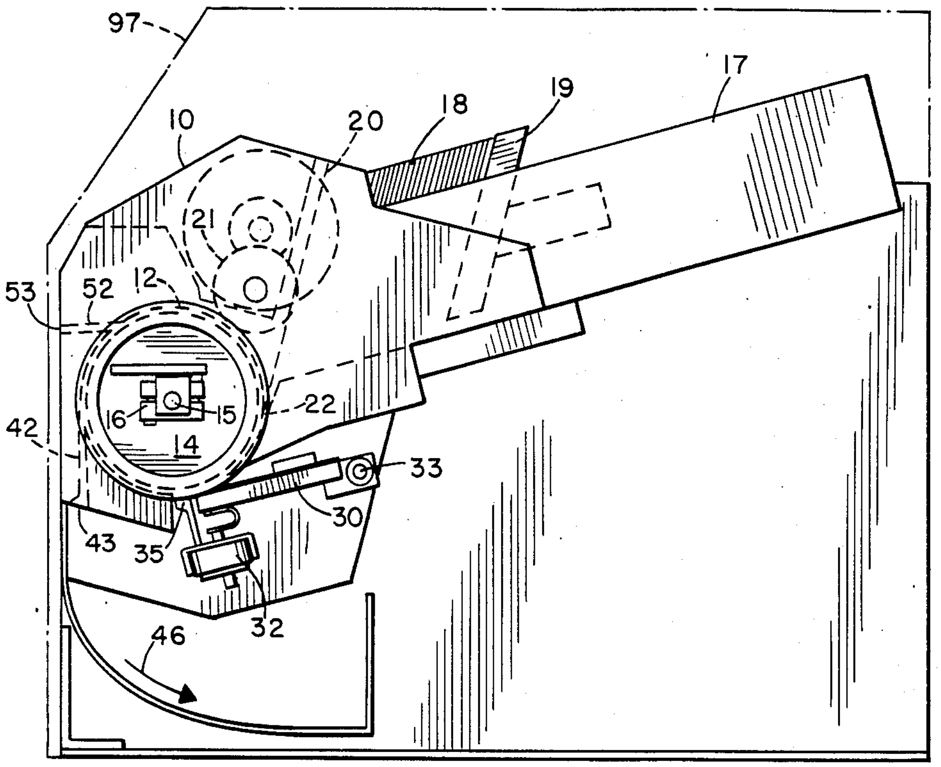
FIG. 1 is a side elevation view of the ticket printing and issuing device.
Figure 2:
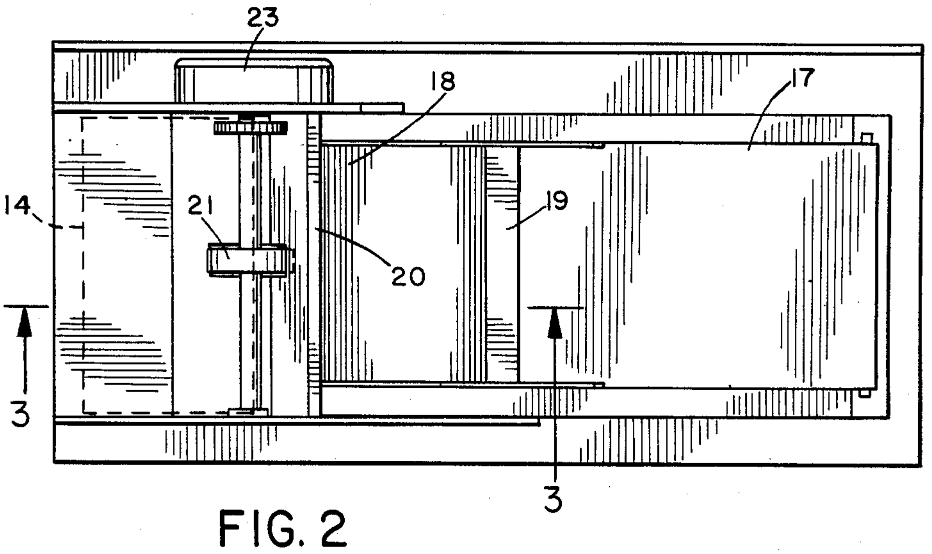
FIG. 2 is a top plan view of the ticket printing and issuing device.
Figure 3:
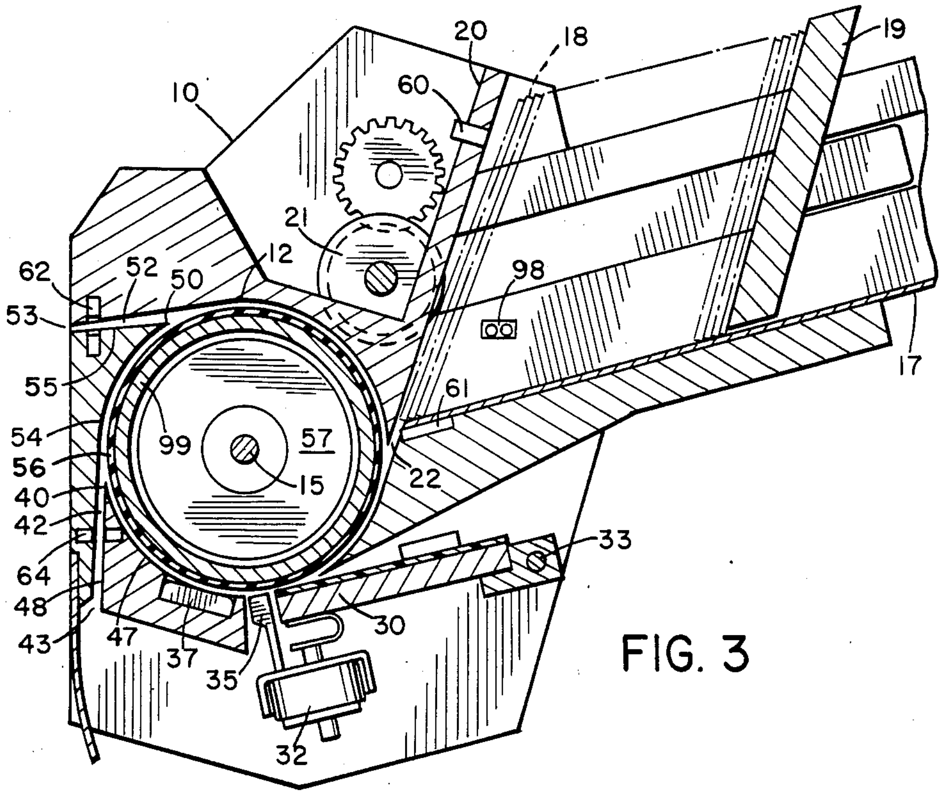
FIG. 3 is an enlarged sectional view taken along line 3—3 of FIG. 2.

Refer now to FIGS. 1-3 for an understanding of the overall structure and major mechanisms in the ticket printing and issuing device of the invention. The device is intended for use in a ticket processing system into which it would be integrated with other functional components to perform general ticket processing transactions. For example, the device of the invention could operate in a remote, unmanned ticket sales terminal that would include a means for accepting cash or credit, a means for receiving customer instructions regarding terms of the transaction, and a means for accumulating transaction information records.

In the postulated ticket transaction scenario, where the device would operate in an automatic terminal, it is recognized that a significant problem arises when a customer fails to accept a processed ticket. In such a case, if a ticket is presented for customer acceptance and not accepted by the customer purchasing it, it would be possible for the ticket to be retrieved and used by a third party having no right to it. The operation of the invention provides for such a possibility by printing a ticket for issue to a customer, offering the ticket for the customer's acceptance, and, if the ticket is not accepted, moving the ticket to an impound area which is not accessible to unauthorized personnel.

The invention is generally understood as a device or apparatus for printing and issuing tickets and consists of a housing 10 defining or containing a cylindrical ticket guide 12. The ticket guide 12 comprises the interior surface of a hollow cylinder in the housing. A ticket is advanced along a revolutionary path around the ticket guide 12 in a feeding direction, which, in the preferred embodiment, corresponds to the clockwise direction in FIG. 1. The force for driving a ticket on the circular path of the ticket guide 12 is provided by a rotating drive cylinder 14. The drive cylinder 14 rotates on a shaft 15 to which it is detachably connected by a releasable, shaft-engaging mechanism 16. The shaft 15 comprises the rotating shaft of an electrical motor which is not shown, in FIGS. 1 and 2. The general arrangement of the circular ticket guide 12, the rotating cylinder 14, and the motor which drives the shaft 15 can be understood by reference to the incorporated co-pending U.S. patent application Ser. No. 909,507.

As taught in the incorporated U.S. patent application, the motor which drives the shaft is a stepper motor whose direction of rotation can be selectably reversed, thereby providing the capability of rotating the cylinder 14 in the clockwise direction or the counterclockwise direction.

Tickets are fed into the ticket guide 12 from a ticket magazine or hopper 17. One of the tickets in the magazine 17 is indicated by reference numeral 18. The tickets are stacked obliquely on edge and retained in a pack configuration at the lower end of the magazine 17 by a gravity actuated ticket retainer 19.

The tickets in the magazine 17 are fed into the ticket guide 12 through a feeding aperture 22 by means of a feed roller 21 driven by a feed roller motor 23, which is conventionally coupled to the feed roller 21 by a geared driving assembly. When the feed roller 21 is rotated in the clockwise direction, a ticket is fed through the feeding aperture 22 into the ticket guide 12. As the ticket advances into the guide, through the feeding aperture 22, its flexibility will cause it to assume a partially curved configuration conforming to the curvature of the ticket guide 12. As the ticket advances into the ticket guide 12 through the feeding aperture 22, the drive cylinder 14 is rotated in the clockwise direction to drive the ticket in the guide in the feeding direction.

A printing and reading mechanism is located adjacent the ticket guide 12 and is arcuately displaced from the feeding aperture 22 in the forward direction. The printing and reading mechanism consists of a conventional thermal printer 30 which is brought into printing engagement with a ticket by a solenoid 32, which thrusts the printer 30 toward a ticket in the ticket guide 12. The printer 30 is pivoted at 33 so that only the front operative end of the printer is brought into contact with a ticket. As shown in FIG. 3, the printing and reading mechanism further includes a ticket-under-printhead (TUP) sensor 35, which can comprise a conventional electro-optical device, and a conventional optical reader 37. The reader 37 is specified as being a device which optically detects information printed on the face of a ticket by the process employed by the thermal printer 30.

Returning again to FIG. 1, advancing arcuately in the forward direction from the printing and reading mechanism along the ticket guide 12, a ramped impound aperture provides an opening from the ticket guide through which a ticket can be fed to an impounding container. The impound aperture is formed between a ramped stationary edge 40 and another, rear surface 42 which is tangential to the ticket guide 12. The impound aperture communicates through an impound channel 43 with an impound bin 46 in which tickets are impounded or escrowed for retrieval by authorized personnel. The ramped stationary edge 40 transitions to an arcuate surface 47 which forms a portion of the ticket guide 12. A rear surface 48, tangential to the ticket guide, and the arcuate surface 47 meet as an apex to form the ramped edge 40.

Advancing still further along the circumference of the ticket guide 12 in the forward direction, there is next encountered a ramped issue aperture formed from a ramped stationary edge 50 and a surface 52 which is tangential to the surface of the ticket guide 12. The edge 50 has the form of the edge 40, the form being determined by an arcuate surface 54 which forms a portion of the guide 12 and a back surface 55 which is tangential to the guide 12. The issuing aperture communicates with an issuing slot 53 through which a ticket is offered for acceptance by a customer. As can be seen, the impounded and issue apertures are arcuately displaced along the ticket guide 12 by an angle greater than 0°.

Referring now to FIG. 3, the structure of the ticket printing and issuing device of FIGS. 1 and 2 is shown in greater and slightly magnified detail. In FIG. 3, the drive cylinder 14 is shown in cross-section with the wall forming the outside surface of the cylinder indicated by reference numeral 99. As shown, a rubber sheath 56 covers the outside wall 99, enabling the drive cylinder to grasp and drive a ticket through the ticket guide 12. The drive cylinder encloses a generally circular step motor 57 which rotatably drives the cylinder through the coupling of the drive shaft 15.

As shown by the greater resolution of FIG. 3, the ticket magazine includes a sensor 60, which provides an indication when the magazine is empty of tickets. Also, a ticket low sensor, 98, indicates when less than a minimum number of tickets are in the magazine. A ticket knife 61 permits the passage of a single ticket through the feeding aperture 22, while blocking a second ticket from simultaneously entering the feeding aperture.

The presence or absence of a ticket in the issuing aperture is sensed by a conventional electro-optical sensor 62. Similarly, the impound aperture includes an electro-optical sensor 64 to detect the presence or absence of a ticket in the impound aperture.

Figure 4:
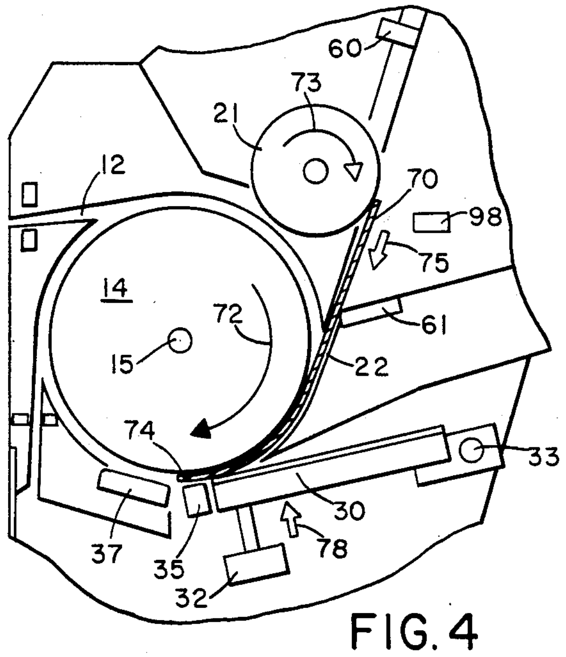
FIG. 4 illustrates schematically the ticket handling mechanism with the ticket in the printing position.
Figure 5:
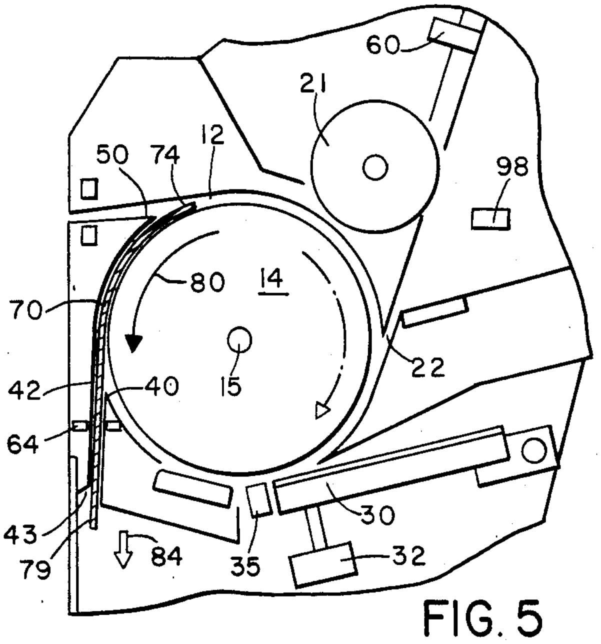
FIG. 5 is similar to FIG. 4, but with a ticket in the impound position.
Figure 6:
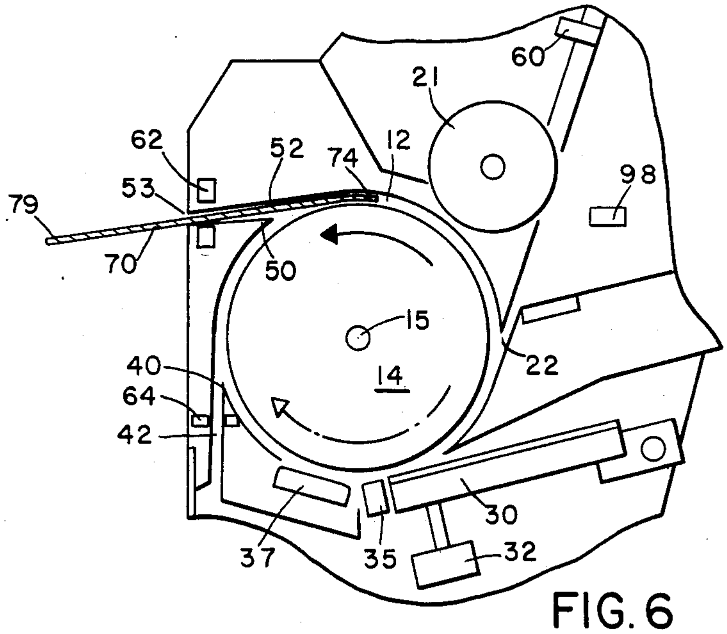
FIG. 6 is similar to FIG. 4, but with a ticket at an issue position.

The operations of the ticket printing and issuing device can be understood with reference to FIGS. 4–6. The feeding of a ticket in the forward direction into the ticket guide is illustrated in FIG. 4, where both the drive cylinder 14 and the ticket magazine feed roller 21 are rotated in the clockwise direction, as indicated by the arrows 72 and 73. When the drive cylinder 14 and feed roller 21 rotate clockwise, a ticket such as the ticket 70 is driven in the direction indicated by the arrow 75, which is the feeding direction and which moves the ticket, leading edge 74 first, in the direction indicated by the arrow 75. As the ticket is driven into the ticket guide 12, the leading edge 74 of the ticket contacts the guide. As the leading edge 74 moves further into the guide, the ticket is engaged by the drive cylinder 14 and driven in the feeding (clockwise) direction in the guide.

Thus, the singulation of a ticket and feeding of the ticket into the ticket guide are accomplished by rotating the feed roller 21 in the clockwise direction, driving a ticket past the input knife 61, energizing the main stepper motor 57 to rotate the drive cylinder 14 in the clockwise direction, all of which will move the ticket 70 into and along the ticket guide until the leading edge 74 passes the TUP sensor 35.

When the leading edge 74 is detected by the TUP sensor, the thermal printer 30 is pivoted into printing engagement with the ticket 70 on the pivot pin 33. Pivoting action is provided by the solenoid 32. In operation, when the solenoid 32 is activated, its piston moves against the printhead 30, thereby pivoting the printhead 30 in the direction of the arrow 78 against the ticket 70.

The printer 30 is a conventional thermal dot-row mechanism operated in synchronism with the drive cylinder 14. When a row of dots is to be printed, the drive cylinder 14 is rotated by the amount necessary to bring the ticket to the proper print location. The printer solenoid 32 is activated, as is the printhead 30, resulting in a row of dots being printed on the ticket. The ticket 70 is then advanced to the next location by rotation of the drive cylinder 14 and another row of dots is printed.

Reading and printing functions are synchronized to movement of the ticket 70 in the ticket guide 12 by the TUP sensor 35. The TUP sensor 35 is a conventional optical sensor providing a two-state signal. The sensor 35 conditions the signal to one state for as long as the ticket intercedes between it and the drive cylinder 14. The signal is deactivated when there is no ticket between the sensor 35 and the cylinder 14.

In synchronism with the printing operation performed by the thermal printer 30, a validation operation is supported by the optical reader 37. The reader 37 is a conventional bar code reader which detects the information printed on the ticket 70 by the thermal printer 30 for purposes of verification, explained below. The information read by the reader is converted into an electronic signal produced by the reader.

FIG. 5 illustrates an impounding operation by which the ticket 70 is fed to the impound hopper 46. After the printing and reading performed as illustrated in FIG. 4, the ticket 70 continues to be advanced in the forward direction by clockwise rotation of the driver roller 14. The driver roller 14 is rotated until the trailing edge 79 of the ticket is advanced to a position between the ramped impound edge 40 and the ramped issue edge 50. When the ticket reaches this point, the direction of rotation of the roller 14 is reversed as indicated by the solid arrow 80 in FIG. 5. The rotation of the drive cylinder 14 in the counterclockwise direction will move the ticket 70 in a reverse direction. When the trailing edge (now the leading edge) 79 of the ticket 70 reaches the impound aperture, the natural spring of the ticket will cause the edge 79 to straighten out and enter the impound aperture between the ramped impound edge 40 and the tangential surface 42. The ticket will then be driven through the impound aperture in an impound direction along a path which is tangential to the ticket guide 12.

FIG. 6 illustrates how a ticket is moved to the issue position. In FIG. 6, it is assumed that the ticket 70 has been driven in the forward direction in the ticket guide 12 until the trialing edge 79 is located between the ramped issue edge 50 and the feeding aperture 22. At this point, the ticket can be driven through the issue aperture by reversing the direction of rotation of the drive cylinder 14 and driving the edge 79 of the ticket between the ramped issue edge 50 and the back surface 52. The ticket moves through the issue aperture in a direction which is tangential to the ticket guide 12.

Figure 7:
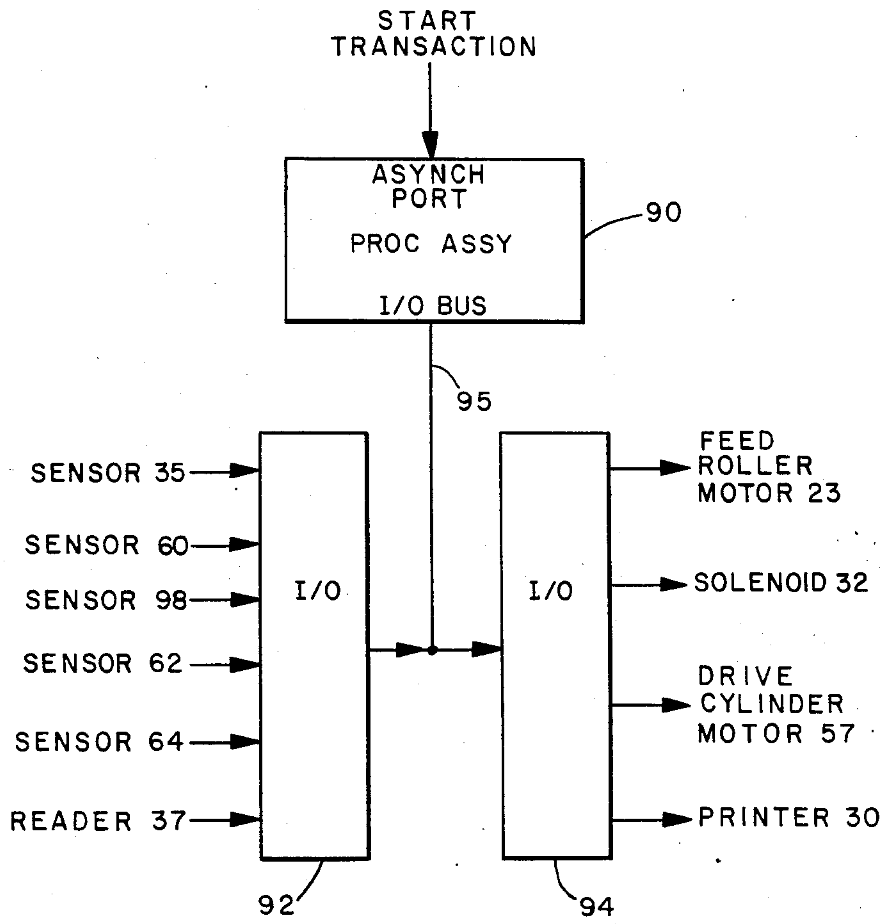
FIG. 7 is a block diagram of the electronics control mechanization which controls the operation of the ticket printing and issuing device.

A control mechanization which synchronizes the operations of the drive cylinder 14, the feed roller 21, and the printing and reading mechanism is illustrated in FIG. 7. The mechanization is conventional and includes a programmable processor assembly 90 which can include one or more microprogrammable microprocessors. The processor assembly has an asynchronous input port through which a START TRANSACTION signal indicating the beginning of a ticket printing and issuing transaction is provided. Such a signal would come, for example, from the modules described above which would be integrated with the device of the invention in a ticket issuing terminal. The processor assembly 90 also includes a port for connection to an input-output databus (I/O BUS). A pair of input-output (I/O) expanders 92 and 94 are conventionally connected by means of a databus 95 to the I/O BUS port of the processor assembly 90.

The purpose of the I/O BUS 95 is to provide conventional input and output channel access to various components of the device of the invention; the input and output channels are conventionally employed to synchronize and control the operations of the components of the invention. As is conventional, operations of the device are controlled by a program in the processor assembly, whose primary features and functions are described below. Input channelization is provided to the processor assembly 90 over the bus 95 through the I/O expander 92. The expander 92 receives signals from the TUP sensor 35, the ticket magazine empty sensor 60, the ticket magazine low sensor 98, the issue aperture sensor 62, the impound aperture sensor 64, and the reader 37. Output channelization is provided to the feed roller motor 23, the solenoid 32, the driver cylinder motor 57, and the thermal printhead 30.

The expander 92 links the respective sensors to the processor assembly 90, enabling the assembly to receive and monitor the progress and location of a ticket in the ticket guide. The expander 92 also enables the processor 90 to receive, analyze, and verify information printed on a ticket by the thermal printer 30 via reader input 37. The expander 94 channels control signals to the motors 23 and 57 to conventionally determine their speeds and directions of rotation and to rotate them in a continuous or step fashion. The channel to the solenoid 32 permits the processor assembly 90 to provide control signals to the solenoid 32, while data to be written on a ticket is channeled to the printer 30.

It will be evident to those well versed in the art that the control mechanization of FIG. 7 can be conventionally mounted on one or more printed circuitboards located within the chassis 97 and connected by conventional signal conduction means to the various components of the ticket writing and issuing device of the invention.

Figure 8:
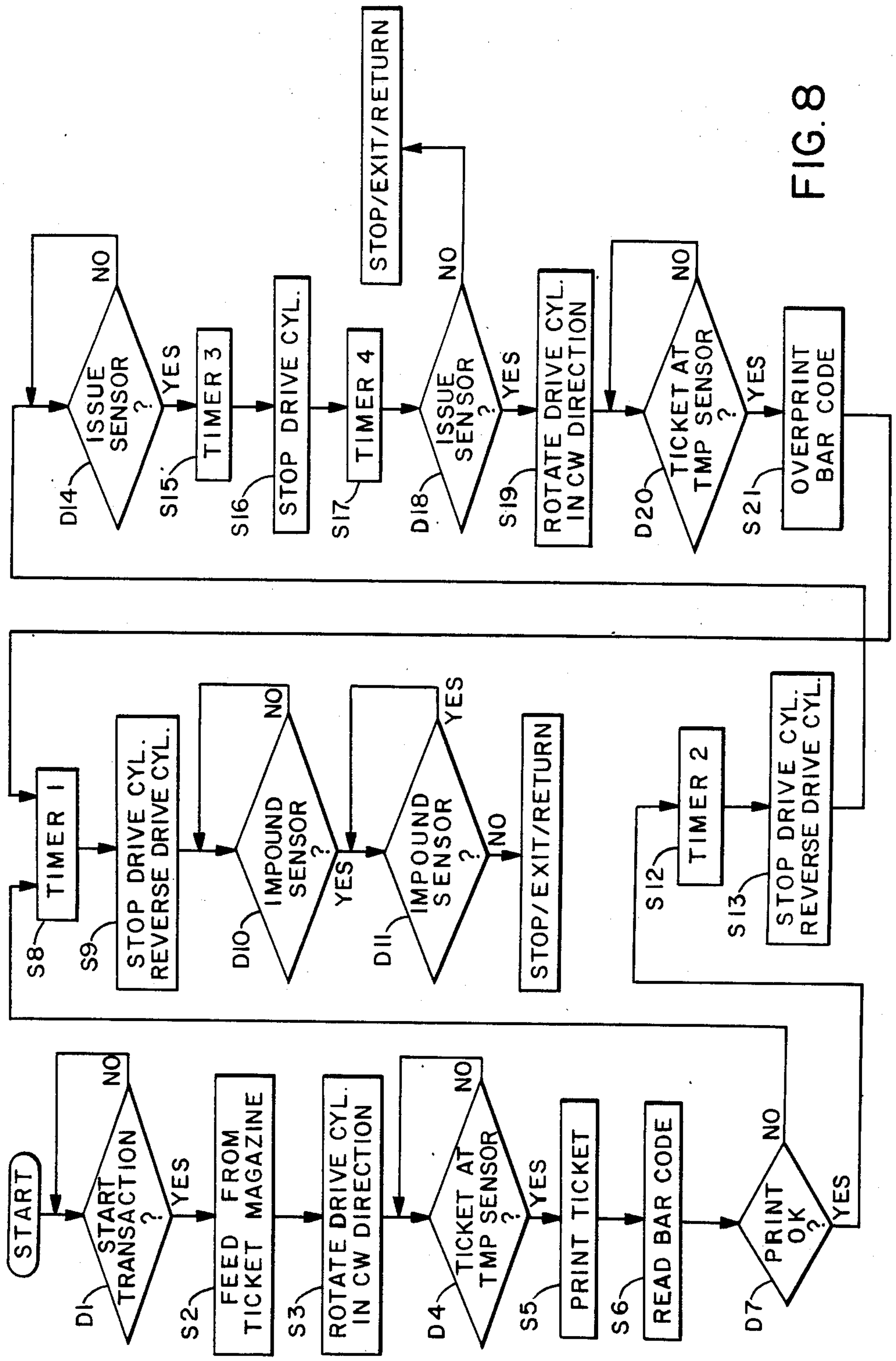
FIG. 8 is a flow diagram illustrating the sequence of steps in printing and issuing or impounding a ticket using the ticket printing and issuing device.

The operations of the ticket printing and issuing device of the invention are realized through the programming of the processor assembly 90. The ticket printing and processing operations are summarized in the flow diagram of FIG. 8. As shown in FIG. 8, the processor assembly 90 continuously searches for a START TRANSACTION signal in decision D1. When a START TRANSACTION signal is received, the positive exit is taken from decision D1 and a ticket is fed from the ticket magazine 17 into the ticket guide 12 in the forward direction in step S2. After step S2, the drive cylinder 14 is rotated in the clockwise direction to drive the ticket being inserted into the ticket guide 12 through the feeding aperture 22 in the forward direction. When the ticket has been driven so that its leading edge is detected by the TUP sensor 35 (step D4), information is printed on the ticket at step S5. The ticket is then advanced in the forward direction, while the information printed in step S5 is read in step S6 by means of the reader. The read information is passed to the processor assembly 90 which verifies the information in decision D7. If the information has been incorrectly printed on the ticket, the negative exit is taken from step D7. When incorrect information is written on the ticket, the roller 14 is rotated in the clockwise direction for a period of time sufficient to move the trailing edge of the ticket in the ticket guide to a position between the ramped edges 40 and 50. In the preferred embodiment, this position is determined by expiration of a software timer (TIMER 1) embedded in the program of the processor assembly 90. The timer is initiated when the read information fails the verification test, and the timer counts for a period of time sufficient to drive a ticket of predetermined length in the feeding direction at a predetermined speed to a position where the trailing edge of the ticket is in the desired location. When the timer times out, the direction of rotation of the drive cylinder 14 is reversed (step S9) and the ticket is driven in the reverse direction through the impound aperture. The drive cylinder 14 is rotated for so long as the presence of the ticket is sensed in the impound aperture by the sensor 64 (D10 and D11). When the sensor 64 indicates that the ticket is no longer in the impound aperture D11 (that is, it is in the impound bin), the processor program turns off the drive cylinder motor 57 and returns to the START step.

Assuming that the processor assembly 90 verifies that valid data has been printed on a ticket in step D7, rotation of the drive roller 14 is maintained in the clockwise direction for a period of time sufficient to move the trailing edge of a ticket in the forward direction to a location between the ramped edge 50 and the feeding aperture 22. The time of this rotation is established by a second software timer (TIMER 2) whose operation is indicated in step S12. When the second timer times out, the direction of rotation of the drive cylinder 14 is reversed and the ticket is driven in the reverse direction through the issue aperture (S13 and D14). Now, the drive cylinder 14 is driven for a period of time sufficient to place the ticket in an issue position which can be understood with reference to FIG. 6.

In FIG. 6 the ticket 70 is in the issue position with the edge 79 of the ticket protruding out of the ticket printing and issuing device. As illustrated in FIG. 8, when the ticket reaches this position, as indicated by expiration of a third software timer (TIMER 3) in step S15, the drive cylinder 14 is stopped rotating (S16). As can be seen from FIG. 6, the edge 74 of the ticket is still retained in the ticket guide 12 between the drive cylinder 14 and the ticket guide 12. If the ticket is accepted by a customer, the ticket will be pulled out of the device of the invention by the customer, with the acceptance of the ticket indicated by the sensor 62 providing an indication of a clear aperture. Alternatively, if the ticket is not accepted by a customer, after the expiration of a predetermined period of time (TIMER 4), the presence of the ticket in the issue aperture will be indicated by the sensor 62 (D18). Thus, in decision D18 of the operational program, the negative exit indicates that the ticket has been accepted by the customer and the program returns to the START step. On the other hand, if the predetermined period of time has expired and the presence of a ticket in the issue aperture is indicated by the sensor 62, the drive cylinder 14 is rotated clockwise (S19), driving the ticket in the forward direction through the ticket guide 12. When the non-accepted ticket is sensed in the guide at the TUP sensor 35 (D20), the bar code portion of the printed ticket is overprinted (S21) and the impound procedure described above is followed and the non-accepted ticket is placed in the impound bin 46.

It should be evident that the above-described procedures can be conventionally implemented by means of an application program written employing conventional programming techniques for the processor assembly 90.

Obviously, many modifications and variations of the above-described invention are possible in light of these teachings. Therefore, it is to be understood that within the scope of the disclosed invention, it may be practiced other than as specifically described.

We claim:

1. An apparatus for printing and issuing tickets or the like, comprising:

a housing with a circular ticket guide;

reversible drive cylinder means enclosed in said ticket guide for driving a ticket in a forward or reverse direction in said ticket guide;

a ticket feed magazine in communication with said ticket guide for feeding a ticket into said ticket guide in the forward direction;

printing and reading means adjacent said ticket guide for printing and reading information on a ticket being driven in said ticket guide, said printing and reading means arcuately displaced from said ticket feed magazine in said forward direction;

ramped impound means adjacent said ticket guide for diverting from said ticket guide a ticket being driven in said reverse direction, said ramped impound means diverting said ticket in an impound direction tangential to said ticket guide;

ramped issue means adjacent said ticket guide for diverting a ticket being driven in said reverse direction from said ticket guide, said ramped issue means diverting said ticket in an issue direction tangential to said ticket guide, said issue direction disposed with respect to said impound direction at an angle not equal to 0; and control means connected to said rotatable drive cylinder means for selectively controlling said drive cylinder means to rotate in said forward direction or said reverse direction.

2. The apparatus of claim 1 wherein said printing and reading means, said ramped impound means, and said ramped issue means are respectively situated in an arcuate sequence adjacent said ticket guide.

3. The apparatus of claim 1 wherein said ramped impound means includes a stationary ramp having an apex which is tangential to said ticket guide, an arcuate surface which forms a portion of said ticket guide, and a substantially flat surface which forms said apex with said arcuate surface, and an impound enclosure for retaining tickets diverted by said ramped impound means.

4. The apparatus of claim 1 wherein said ramped issue means includes:

a stationary ramp having an apex which is tangential to said ticket guide in said feeding direction;

an arcuate surface which forms a portion of said ticket guide; and a substantially flat surface which forms said apex with said arcuate surface.

5. The apparatus of claim 1 wherein said control means selectively controls the direction of rotation according to the condition of a composite sensor signal and said apparatus further includes sensor means adjacent said writing and reading means and adjacent said ramped issue means for conditioning said composite sensor signal based upon the detection of a ticket at a predetermined sequence of locations in said ticket guide.

6. A method for writing and issuing tickets using an apparatus having a circular ticket guide, means for selectively driving a ticket in a forward or a reverse direction in the ticket guide, writing and reading means adjacent said ticket guide for writing and reading information on a ticket in said guide, and means for diverting a ticket being driven in the reverse direction in the ticket guide, comprising the steps of:

feeding a ticket into the ticket guide and driving said ticket in the forward direction in said ticket guide past said writing and reading means;

writing transaction information onto said ticket while it is being driven past said writing and reading means;

driving said ticket with said written information past an issue diverting point in said ticket guide;

driving said ticket in the reverse direction while diverting said ticket at said issue diverting point from said ticket guide to a stationary issue position in which a portion of said ticket extends out of said ticket guide through said issue outlet; and if said ticket is not removed from said ticket guide after being diverted to said stationary issue position, driving said ticket from the issue position wholly back into said ticket guide in the forward direction, overprinting said ticket, advancing said ticket in the forward direction to an impound diverting point, and driving said ticket in said reverse direction while diverting said ticket at said impound diverting point wholly out of said ticket guide to an impound position.

* * * * *